Patented Feb. 20, 1951

2,542,312

UNITED STATES PATENT OFFICE 2,542,312

VAT DYESTUFF OF THE ACRIDONE SERIES

Kenneth Alfred John Chamberlain and David Alexander Whyte Fairweather, Blackley, Manchester, England, assignors to Imperial Chemical Industries Limited, a corporation of Great Britain No Drawing. Application March 20, 1950, Serial No. 150,804. In Great Britain March 30, 1949

2 Claims. (Cl. 260—276)

This invention relates to a new vat dyestuff and more particularly to a new brown dyestuff which is especially valuable for use in textile printing.

In British Specification No. 410,552 it was proposed to manufacture new vat dyestuffs containing nitrogen by reacting with such nitrogenous compounds as contain in the molecule one or more replaceable hydrogen atoms attached to nitrogen with halogenated derivatives of condensation products which have been obtained by treating glyoxal-dianthraquinone compounds with an acid condensing agent with or without previously converting them into alkali-condensed products. Amongst the halogenated derivatives of condensation products mentioned in the specification is that obtained from 1-chloroanthrone namely $a:a$-dichloroacedianthrone.

We have now found that when $a:a$-dichloroacedianthrone is condensed with two molecular proportions of 6-amino-3':4'-phthaloylacridone there is obtained a new dark brown dyestuff which has superior printing properties to previously known dyestuffs in its ability to build up to heavy shades of excellent all-round fastness to wet treatments and to light, and by the property of not tendering the cotton fibre.

The 6-amino-3':4'-phthaloylacridone may be made by the process of British Specification No. 587,006 and the system of nomenclature and numbering used for this compound in the present specification is that indicated in British Specification No. 587,006.

The $a:a$-dichloroacedianthrone used in the process of our invention is that obtained from 1-chloroanthrone (which itself is obtained by reduction of 1-chloroanthraquinone). The chlorine atoms are believed to be in the 7 and 15 positions in the acedianthrone nucleus.

According to our invention therefore we provide a new vat dyestuff of the formula:

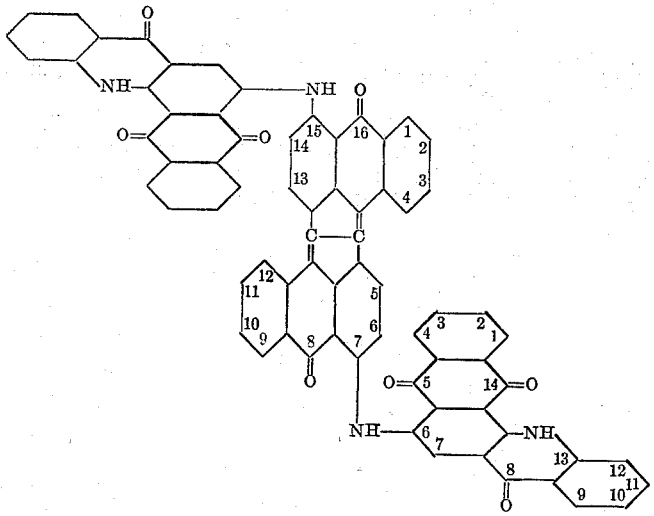

According to a further feature of our invention we provide a process for the manufacture of a new vat dyestuff which comprises condensing 1 molecular proportion of $a:a$-dichloroacedianthrone with 2 molecular proportions of 6-amino-3':4'-phthaloylacridone.

The condensation may be carried out by heating the reagents together in a liquid medium, for example naphthalene, preferably in the presence of a mild alkali and a copper salt and/or copper powder.

The new dyestuff of our invention may be used for dyeing cellulosic textile materials, for example cotton and viscose artificial silk, but as already indicated it is especially valuable for use in textile printing processes and the process of printing textile materials with the new vat dyestuff forms a further feature of our invention.

The invention is illustrated but not limited by the following example in which the parts are by weight.

*Example*

47.5 parts of the product obtained by subjecting the condensation product of 1-chloro-9-anthrone and glyoxal to the action of sulphuric acid and acetic anhydride in nitrobenzene by the method described in British Specification No. 551,622, 70 parts of 6-amino-3':4'-phthaloylacridone, 27 parts of sodium carbonate, 8.4 parts of cuprous chloride and 4.2 parts of copper powder are stirred together in 840 parts of naphthalene at 215–220° C. for 24 hours. The reaction mixture is then cooled to 100–110° C. and pyridine is added. The precipitated product is filtered off and washed with pyridine until the washings are colourless and then with alcohol to remove all the pyridine. The resulting paste is suspended in dilute hydrochloric acid, boiled for a few minutes, filtered, washed acid-free and dried.

The product is a black powder which gives a greenish-blue colour in concentrated sulphuric acid and dyes and prints cotton in strong dark brown shades.

What we claim is:

1. A new vat dyestuff of the formula:

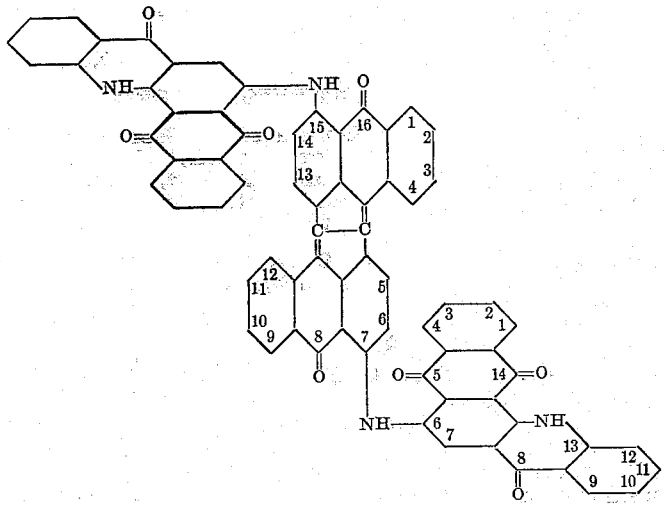

2. Process for the manufacture of a new vat dyestuff which comprises condensing 1 molecular proportion of a:a-dichloroacedianthrone with 2 molecular proportions of 6-amino-3':4'-phthaloylacridone.

KENNETH ALFRED JOHN
        CHAMBERLAIN.
DAVID ALEXANDER WHYTE
        FAIRWEATHER.

No references cited.